United States Patent Office 3,751,524
Patented Aug. 7, 1973

3,751,524
MONOVINYLIDENE AROMATIC POLYMER COMPOSITIONS MODIFIED WITH OLEFIN POLYMERS
Daniel H. Haigh, Beaverton, Mich., and James B. Louch, Hampton, Va., assignors to The Dow Chemical Company, Midland, Mich.
No Drawing. Filed June 2, 1971, Ser. No. 149,379
Int. Cl. C08f 19/00
U.S. Cl. 260—878 R
7 Claims

ABSTRACT OF THE DISCLOSURE

Monovinylidene aromatic polymers having improved toughness and surface characteristics are prepared by polymerizing monomeric compositions of monovinylidene aromatic monomers, rubber, cross-linkable material and a modifying amount of high molecular weight olefin polymer.

BACKGROUND OF THE INVENTION

This invention relates to a method for providing reinforced monovinylidene aromatic polymers. More particularly, it relates to a laminate comprising a reinforcing element and polymeric monovinylidene aromatic material.

A moldable glass filled polystyrene has been prepared by suspending glass fibers in monomeric styrene and polymerizing the mixture in conjunction with agitation (U.S. Pat. 2,688,744). It is also known to interpolymerize monovinylidene aromatic compounds such as styrene with natural or synthetic rubber as taught by U.S. Pat. 2,694,692. Styrene and other monovinylidene aromatic monomers have also been copolymerized with a polyvinyl aromatic hydrocarbon such as divinylbenzene in the presence or absence of reinforcing glass fibers (U.S. Pat. 3,301,739).

Heretofore there has been no interest in preparing finished articles or structures of reinforced monovinylidene aromatic polymers directly from the monomer since the resulting compositions are porous, opaque and of low physical strength. Furthermore, a satisfactorily reinforced monovinylidene aromatic structure using fibers such as glass or asbestos, as roving, matting, or as cloth, has not been prepared by using polymerized styrene or other polymerized monovinylidene aromatic monomers as the resin. Such polymerized mixtures were only of value as unitary objects when molded under high pressure at elevated temperatures. Typical conditions are taught by U.S. Pat. 2,688,744 wherein use of a pressure of at least 1,000 p.s.i. and a temperature of at least 125° C. were employed. Only recently, e.g., in U.S. Pat. 3,301,739, has it been known to prepare a strong, translucent reinforced structure of styrene monomer copolymerized with a cross-linking monomer such as divinylbenzene. As taught therein a reinforced structure having useful properties is only obtained if a vinyl silane finishing agent is applied to the glass fibers prior to dispersing the fibers in the monomeric mixture.

Although the compositions prepared by the foregoing prior art techniques are generally high in flexural strength, such compositions which generally contain inorganic materials as fillers are generally brittle and have fairly poor surface characteristics. Therefore it would be highly desirable to provide an inexpensive means for imparting toughness and improved surface characteristics to such compositions.

SUMMARY OF THE INVENTIONS

In accordance with the present invention, reinforced monovinylidene aromatic polymer compositions having improved toughness and surface characteristics are prepared from curable compositions comprising from about 40 to about 93.5 weight parts of monomeric material containing at least a major amount of monovinylidene aromatic monomer, from about 1 to about 15 weight parts of a natural or synthetic rubber, from about 0.5 to about 15 weight parts of a cross-linkable material and from about 5 to about 40 weight parts of a high molecular weight olefin polymer modifier, said weight parts being based on 100 weight parts of curable composition.

The monovinylidene aromatic polymer composition of the present invention are useful in the production of molded articles such as panels, piping, housing for various electrical appliances, auto parts, boats, skis, recreational vehicles, conduits, drainage pipes, diswashers and the like.

DESCRIPTION OF THE PREFERRED EMBODIMENTS

In the curable compositions of the present invention, at least a major amount by weight of the monomeric material is monovinylidene aromatic monomer. By the terminology "at least a major amount" is meant from about 50 weight percent to about 100 weight percent of total monomeric material. Monovinylidene aromatic monomer includes monovinylidene carbocyclic aromatic monomers having (1) a carbocyclic aromatic nucleus such as benzene, naphthalene, bisphenol, biphenyl and other condensed aromatic ring groups and (2) a substituent vinyl group, e.g.,

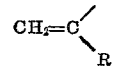

wherein R is hydrogen or alkyl, on the aromatic nucleus. Specific compounds within this genus include the following. styrene, ar - methylstyrene, alphamethylstyrene, ar-ethylstyrene, ar,ar - dimethylstyrene, ar,alpha -dimethylstyrene, ar-t-butylstyrene, ar-t-amylstyrene, ar - t - hexylstyrene, ar - t - octylstyrene, ar - isopropylstyrene, ar,ar-diethylstyrene, ar-chlorostyrene, ar - bromostyrene, ar,ar-dichlorostyrene, ar,ar,ar-trichlorostyrene, ar,ar - dibromostyrene, ar - t - amylstyrene, vinyl naphthalene, methoxystyrene, cyanostyrene, acetylstyrene and mixtures thereof. In instances wherein the monomeric material contains less than 100 weight percent of monovinylidene aromatic monomer, the remaining monomeric material is suitably ethylenically unsaturated monomer copolymerizable with monovinylydene aromatic monomer. Examples of such copolymerizable monomers include ethylenically unsaturated nitriles such as acrylonitrile, methacrylonitrile, fumaronitrile, α-methylene glutaronitrile, ethacrylonitrile and the others having less than 15 carbon atoms; the alkyl esters or substituted alkyl esters of α,β-ethylenically unsaturated carboxylic acids wherein the alkyl or substituted alkyl moiety has from 1 to 12 carbon atoms and the acid moiety has from 3 to 8 carbon atoms, e.g., methyl acrylate, ethylacrylate, methyl methacrylate, n - butyl acrylate, isobutyl acrylate, ethyl α-chloro acrylate, 2-ethylhexyl acrylate, lauryl methacrylate, β - hydroxyethyl acrylate, 2 - hydroxyethyl methacrylate, methyl itaconate, and diethylmaleate; ethylenically unsaturated ketones and ethers such as vinyl methyl ketone, methyl isopropenyl ketone, vinyl ethyl ether and the like; and mixtures of the foregoing monomers.

The monomeric material generally comprises from about 40 to about 93.5 weight parts per 100 weight parts of the curable composition, preferably from about 45 to about 88 weight parts.

In the present invention, a cross-linkable material, generally a polyethylenically unsaturated monomer, is incorporated into the monomeric material. The cross-linkable monomers particularly within the purview of this invention are those having an aromatic nucleus with at least two substituent vinyl groups wherein the aromatic nucleus can be that of benzene, naphthalene, biphenyl, and other aromatic condensed rings. Specific examples include divinylbenzene, divinyltoluene, divinylxylene, divinylnaphthalene, diisopropenyl benzene, vinyl isopropenyl benzene, and trivinylbenzene, with divinylbenzene being preferred. In lieu of the foregoing cross-linkable monomers, cross-linkable polymers, e.g., cross-linkable polyesters, may be employed such as vinyl and/or allyl esters of polybasic acids such as diallyl phthalate, diallyl carbonate, triallyl acetylcitrate, and triallyl cyanurate, vinyl and allyl esters of $\alpha,\beta$-ethylenically unsaturated carboxylic acids such as vinyl acrylate, vinyl methacrylate, diallyl fumarate, allyl methacrylate, diallyl maleate, divinyl maleate and the like; and acrylic and/or methacrylic acid esters of polyhydric alcohols such as ethylene glycol dimethacrylate, diethylene glycol diacrylate and the like. Other cross-linkable materials commonly employed in curable compositions are also suitable for the purposes of this invention. It is further understood that mixtures of cross-linkable monomers and/or cross-linkable polymers may also be employed. It is desirable to employ from about 0.5 to about 15 weight parts of cros-linkable material, inclusive of both cross-linkable monomer and polymer, per 100 weight parts of curable composition, preferably from about 1 to about 10 weight parts.

Natural and/or synthetic rubbers generally comprise from about 1 to about 15 weight parts per 100 weight parts of the curable composition, preferably from about 2 to about 15 weight parts. Any known natural or synthetic rubber is suitable for the purposes of this invention. Particularly suitable, however, are the generally high molecular weight rubbers such as the butadiene homopolymers and copolymers of butadiene with styrene and other monomers such as acrylonitrile, natural rubbers, polyisoprene, butyl rubber, ethylene/proplene copolymer rubber, copolymers of two or more conjugated dienes and the like. Preferably the rubbers are polybutadiene, polyisoprene or copolymers thereof with monovinylidene carbocyclic aromatic monomer and/or acrylonitrile. Such rubbers can be prepared in conventional ways, e.g., by polymerization of the monomers in an inert organic solvent reaction medium using stereospecific catalyst such as butyllithium, aluminum alkyls or titanium halides. Such synthetic rubbers are known and are commercially available . Most preferred are those rubbers having a Mooney number ML 1+4 (212° F.) in the range of from about 30 to about 60.

The high molecular weight olefin polymer modifier is incorporated into the curable composition in amount in the range of from about 5 to about 50 weight parts of olefin polymer per 100 parts of curable composition, preferably from about 7 to about 48 weight parts. Suitable olefin polymer modifiers are generally normally solid thermoplastic polymers having polyethylenic backbones. Exemplary olefin polymer include the homopolymers and copolymers of aliphatic $\alpha$-monoolefins and haol-substituted aliphatic $\alpha$-monoolefins having from 2 to 12 carbon atoms such as ethylene, propylene, 1-butene, 1-hexene, methyl 1-pentene, vinyl chloride, vinyl bromide, vinylidenechloride, and the like. Also included are the copolymers of the foregoing alpha monoolefins and halosubstituted alpha monoolefins with other ethylenically unsaturated monomers such as acrylic acid, methacrylic acid, ethyl acrylate, methyl methacrylate, etc. Of the foregoing, high density polyethylene is preferred. The olefin polymer modifier is generally swelled but not dissolved by the monovinylidene aromatic monomer at ambient temperature and is preferably in the form of a fine powder or a fine fiber.

Although no required, it is generally desirable to employ an effective amount of a free radical generating initiator in the curable compositions of this invention. The initiator suitably incorporated into the curable compositions include all peroxide types, e.g., peroxide, hydroperoxide, peracids and peresters. Exemplary initiators include dicumyl peroxide, di-t-butyl peroxide, t-butyl-cumyl peroxide, t-butyl hydroperoxide, cumyl hydroperoxide, t-butyl perbenzoate, t-butyl peroctoate, 2,-2-bis-(t-butylperoxy)-butane, benzoyl peroxide, lauroyl peroxide, and the like, with t-butyl perbenzoate and t-butyl peroctoate being preferred. Such initiators are usually employed in concentrations in the range of from about 0.01 to about 10 weight parts per 100 parts of the curable composition, preferably from about 0.1 to about 8 weight parts. Under certain conditions, thermal initiation, generally believed to be a free-radical type initiation, can be employed instead of the foregoing initiators.

It is also within the purview of this invention to include promoters such as cobalt, manganese, iron, nickel, and zirconium in the form of compounds compatible with the monomer and also accelerators such as N,N-dimethylaniline in order to shorten total cure time for the curable composition.

It is possible also to include fillters such as divided silicas, glasses, clays, carbon blacks, sand, calcium carbonate, etc., in the curable composition. Such materials serve to adjust viscosity as well as to impart other valuable characteristics.

In preferred embodiments, the foregoing curable composition is then laminated to the reinforcing fiber or agent by applying the composition to a reinforcing agent substrate or by dispersing the reinforcing agent in the composition and then curing the composition. From about 5 to about 100 weight parts of reinforcing element is employed per 100 weight parts of curable composition, preferably from about 10 to about 70 weight parts. A laminate, according to this invention, is defined as a composite mass of a reinforcing element in a liquid curable composition which has set to a tough reinforcing substance. Suitable reinforcing elements include layers of reinforcing elements and cured composition, reinforcing elements in the form of fibers imbedded in such cured composition, and fibers in the form of roving or strands which are saturated with curable composition and formed in a hollow cylindrical pipe or other directionally wound objects. The bonding of the curable composition to the reinforcing element can be accomplished by any known method, and the resulting bonded material can be set to any desired shape by lay up, molding, or the like. For example, the curable composition can be combined with glass, cloth, or mat by brush impregnation; by being poured into the center of several plies of dry glass cloth assembled on cellophane covered glass plate; by dipping the glass cloth or glass mat into the monomer mixture. Thus, one method used in the manufacture of solid rectangular laminates is to form layers of the curable composition and glass fiber. After the desired thickness is obtained, the sheet is cured to a unitary reinforced plastic composition. Another method can be used for the manufacture of cylindrical hollow pipes or ducts, for example, glass fibers or fibers of reinforcing material can be dipped in the curable composition and wound about a steel mandril. This can be accomplished by any known method.

The resulting laminates of curable composition and reinforcing elements are subsequently cured by any known method. A suitable method is by baking in a press mold at a temperature between room temperature and 350° F.

for between 1 minute and 2 hours. A post cure, if desired, may then be employed at a temperature between 250° F. and 400° F. for one to ten hours. Thus, in accordance with this invention, there is provided a reinforced plastic material comprising a reinforcing element and a polymer composition of polymerized monovinylidene aromatic monomer and cross-linking material, a rubber, and a high molecular weight olefin polymer, which reinforced plastic material has improved toughness and surfacing characteristics when viewed with respect to the other compositions of the prior art. It should be noted that laminates, which are prepared from different types of monovinylidene aromatic material and different cross-linking monomers, may have certain specific advantages. For example, the copolymer of an alkylstyrene with a polyvinyl aromatic hydrocarbon, e.g., divinylbenzene, provides a laminate with improved physical properties at elevated temperatures as compared to using a simple styrene with the same proportion of divinylbenzene. A reinforced laminate prepared from a copolymer of halogenated styrene with divinylbenzene is fire retardant and has superior strength at both ordinary and high temperatures.

The following examples are submitted to illustrate the invention and should not be construed as limiting its scope. Unless otherwise indicated, all parts and percentages are based on weight.

Examples 1–6

Five curable monomeric mixes are prepared with components included therein shown in Table I. Two layers of glass mat (Owens Corning M8600-2 oz., 13" x 0.1" x 13") are impregnated with the mix of Example 1, and two layers of glass mat are similarly impregnated with the mixes of Examples 2–6 to provide a total of 6 impregnated mats each having two layers of glass mat. The impregnated mats are then placed in a match die press (13" x 0.1" x 13") and subjected to curing conditions as indicated in Table I to provide laminates (Examples Nos. 1–6) having dimensions of 13" x 13" x 0.1". The flexural strength, modulus and toughness of the laminates are determined and the results of these determinations are indicated in Table I. In a manner similar to the foregoing, a control laminate is prepared in which high density polyethylene is not present in the monomeric mixes. The control laminate (C) is also tested for flexural strength, modulus and toughness, and the results are recorded in Table I.

TABLE I

| Example Number | 1 | 2 | 3 | 4 | 5 | 6 | C* |
|---|---|---|---|---|---|---|---|
| Components of monomer mixes, wt. pts.: | | | | | | | |
| Styrene | 805 | 900 | 900 | 950 | 283 | 566 | 854 |
| t-Butyl styrene | | | | | 762 | 334 | |
| Diene rubber [1] | 89 | | 100 | 50 | 55 | 100 | 60 |
| Ethylene/propylene rubber [2] | | 100 | | | | | |
| High density polyethylene [3] | 179 | 600 | 600 | 700 | 400 | 200 | |
| Divinyl benzene [4] | 36 | 80 | 80 | 40 | 40 | 40 | 86 |
| t-Butyl peroctoate | 9 | 20 | 20 | 10 | 11 | 20 | 5 |
| t-Butyl perbenzoate | 18 | 30 | 30 | 10 | 22 | 30 | |
| Di-t-butyl peroxide | | | | | | | 10 |
| Zinc stearate | 23 | 26 | 26 | 26 | 27 | 22 | 12 |
| Clay [5] | 400 | | | | 350 | 174 | 500 |
| Temperature of cure, °F | 300 | 300 | 300 | 300 | 300 | 300 | 300 |
| Time of cure, min | 5 | 5 | 5 | 5 | 3 | 5 | 5 |
| Pressure of die, p.s.i.g | 591 | 591 | 591 | 591 | 100,000 | 100,000 | 591 |
| Flexural strength,[6] p.s.i. at— | | | | | | | |
| Room temperature | 19,065 | 18,194 | 17,651 | 18,879 | 21,382 | 24,538 | 14,000 |
| 150° C | 1,814 | 1,742 | 1,596 | 1,496 | 1,779 | 2,212 | |
| Modulus,[7] p.s.i. at— | | | | | | | |
| Room temperature | 813,706 | 712,900 | 663,455 | 766,616 | 896,376 | 982,936 | 750,000 |
| 150° C | 126,765 | 62,047 | 68,926 | 79,086 | 70,428 | 156,889 | |
| Toughness [8] | Good | Good | Good | Good | Good | Good | Fair |

[1] Rubbery polybutadiene (Firestone Diene 55A).
[2] Rubbery terpolymer of 25% ethylene, 70% propylene and 5% methylene norbornylene.
[3] Polyethylene having a density of 0.96 g./cc. and melt index of 8 decig./min. (ASTM D-1228-65T(E)) in form of a powder having particle size of 150 microns.
[4] A 57.8% solution of divinyl benzene in ethylvinylbenzene.
[5] McNamee clay.
[6] ASTM D790.
[7] ASTM D790.
[8] General Motors 370-64-33 Test for toughness of polymers wherein a steel ball having a radius of 1½" and weight of ½ pound is dropped from varying heights onto the laminate (13" x 13" x 0.1") supported by a ring having an inside diameter of 5". The degree of cracking is observed for each sample following the foregoing test by applying a dye to the surface of the laminate and counting the number and measuring size of cracks. A rating of Good indicates no observable cracking when the ball is dropped from a height of 8 inches. A rating of Fair indicates observable cracking when the ball is dropped from such height.

* Not an example of the invention.

What is claimed is:
1. A curable composition comprising
   (1) from about 40 to about 93.5 weight parts of a monomeric material, at least a major amount of which is monovinylidene aromatic monomer and the remaining monomeric material being an ethylenically unsaturated monomer copolymerizable with said monovinylidene aromatic monomer;
   (2) from 1 to about 15 weight parts of a rubbery polymer of a conjugated diene;
   (3) from about 0.5 to about 15 weight parts of a polyethylenically unsaturated, cross-linkable monomer, and
   (4) from about 5 to about 40 weight parts of a high molecular weight, high density polyethylene, said weight parts being based on 100 parts of the curable composition.
2. The composition according to claim 1 wherein the monomeric material is entirely monovinylidene carbocyclic aromatic monomers.
3. The composition according to claim 2 wherein the monovinylidene carbocyclic aromatic monomer is styrene.
4. The composition according to claim 1 comprising from about 40 to 93.5 weight parts of monovinylidene aromatic monomer; from about 1 to about 15 weight parts of a rubbery polymer of a conjugated diene; from about 0.5 to about 15 weight parts of a cross-linkable monomer having an aromatic member and at least two substituent vinyl groups, and from about 5 to about 40 weight parts of a high molecular weight, high density polyethylene.
5. The composition according to claim 4 wherein the monovinylidene aromatic monomer is styrene, the rubbery polymer is polybutadiene, the cross-linkable monomer is divinyl benzene and the polymer of aliphatic α-monoolefin is polyethylene.

6. The curable composition according to claim 1 which contains from about 0.01 to about 10 weight parts of a free-radical generating initiator per 100 parts of the curable composition.

7. The curable composition according to claim 6 wherein the composition contains from about 0.1 to about 10 weight parts of a peroxide type catalyst per 100 weight parts of curable composition.

References Cited
UNITED STATES PATENTS

| | | | |
|---|---|---|---|
| 3,230,186 | 1/1966 | Kreibich et al. | 260—878 R |
| 2,616,864 | 11/1952 | Donaldson et al. | 260—886 |
| 3,445,543 | 5/1969 | Gruver | 260—880 R |

JOSEPH L. SCHOFER, Primary Examiner

A. HOLLER, Assistant Examiner

U.S. Cl. X.R.

260—880 R, 886

UNITED STATES PATENT OFFICE
CERTIFICATE OF CORRECTION

Patent No. 3,751,524           Dated August 7, 1973

Inventor(s) Daniel H. Haigh and James B. Louch

It is certified that error appears in the above-identified patent and that said Letters Patent are hereby corrected as shown below:

Column 3, line 35, change "cros-linkable" to --cross-linkable--.

Column 3, line 69, change the word "haol-" to --halo- --.

Column 4, line 8, change the word "no" to --not--.

Column 6, in Table I, under the Heading "6", second line from the bottom, the number "156,889" should be --165,889--.

Column 6, in Table I in Footnote 3, the number in the parenthesis should be changed from "D-1228" to read --D-1238--.

Signed and sealed this 18th day of December 1973.

(SEAL)
Attest:

EDWARD M. FLETCHER, JR.
Attesting Officer

RENE D. TEGTMEYER
Acting Commissioner of Patents